United States Patent
Kato (10) Patent No.: US 12,186,910 B2
(45) Date of Patent: Jan. 7, 2025

(54) DEVICE FOR CONTROLLING RETURN OF ROBOT TO ORIGIN THEREOF, AND METHOD OF SEARCHING RETURN PATH OF ROBOT TO ORIGIN THEREOF

(71) Applicant: DENSO WAVE INCORPORATED, Chita-gun (JP)

(72) Inventor: Yuya Kato, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 206 days.

(21) Appl. No.: 17/680,974

(22) Filed: Feb. 25, 2022

(65) Prior Publication Data
US 2023/0103364 A1    Apr. 6, 2023

(51) Int. Cl.
*B25J 9/16* (2006.01)
*G05B 19/4155* (2006.01)

(52) U.S. Cl.
CPC ........ *B25J 9/1664* (2013.01); *G05B 19/4155* (2013.01); *G05B 2219/40269* (2013.01)

(58) Field of Classification Search
CPC ...... G05B 19/4155; G05B 2219/50042; G05B 2219/40269; B25J 9/1664
See application file for complete search history.

(56) References Cited

U.S. PATENT DOCUMENTS

| | | | | |
|---|---|---|---|---|
| 2007/0142967 A1* | 6/2007 | Volcic | ............... | B25J 9/1674 700/245 |
| 2011/0213497 A1* | 9/2011 | Nair | ............... | B25J 9/1666 700/255 |
| 2013/0006423 A1* | 1/2013 | Ito | ............... | B25J 9/1612 901/46 |
| 2019/0134814 A1* | 5/2019 | Inomata | ............... | B25J 9/042 |
| 2021/0060778 A1* | 3/2021 | Butterfoss | ............... | B25J 9/1656 |
| 2021/0069905 A1* | 3/2021 | Zhang | ............... | B25J 9/1664 |

FOREIGN PATENT DOCUMENTS

JP    2009-090383 A    4/2009

* cited by examiner

*Primary Examiner* — Stephen Holwerda
(74) *Attorney, Agent, or Firm* — Oliff PLC

(57) ABSTRACT

In a robot controller, return of a position (including posture) of a robot arm to an origin thereof is controlled along a searched return path, when there occurs an abnormality against the robot. It is determined whether there is a trajectory portion regarded as being a straight line on a motion trajectory of the arm, based on the operation log data recorded in a recording unit when it is determined that the arm should be returned to the origin. Operation log data of a node are decimated (i.e., downsampled), which are present between two nodes which are at both ends of a trajectory portion regarded as being a straight line when the trajectory portion is regarded as being the straight line. Then, the return path is calculated, along which the arm returns to the origin, based on remaining operation log data.

11 Claims, 9 Drawing Sheets

DEVICE FOR CONTROLLING RETURN OF ROBOT TO ORIGIN THEREOF, AND METHOD OF SEARCHING RETURN PATH OF ROBOT TO ORIGIN THEREOF

BACKGROUND

Technical Field

The present disclosure relates to a device for controlling return of a robot to an origin thereof and a method of searching a return path of a robot to an origin thereof. In particular, the present disclosure relates to a control device which makes a robot return a position and a posture of an arm (i.e., a robot arm or a manipulator) thereof to their predetermined origins, in the robot is provided as a movable portion thereof, and a method of searching a return path of the arm to an origin thereof.

Related Art

In recent years, robots that perform task on objects, such as grasping objects, are frequently used in the industrial and service fields.

For example, in facilities (such as manufacturing factories) using industrial robots, when an abnormality occurs in a robot during automatic operation of the robot, the robot is made to stop (i.e., is forced to make an emergency stop). In this case, in order to return the robot (robot arm or manipulator) to the work it was doing before making a stop, it is required to return the robot to an origin position defined by a robot program and then restart the robot program. It is said that in general, in starting-up of a facility, approximately 60% of man-hours is spent for preparation and modification of robot programs for executing return operations to the origin, i.e., original position and posture of the robot, in emergency stop.

Depending on the environment in which the robot is installed, there may be a case where equipment that did not exist in the original design has been added, or the CAD data of the facility is not supplied in a state recognizable by the robot. Therefore, a peripheral equipment model of other companies may not always be used to calculate a safe return path. Due to these reasons, a considerable amount of time is required for preliminary preparation such as setting of the direction for return operation and categorization of operation according to the state of the robot.

For example, JP 2009-90383 A exemplifies a method of origin return of a robot for returning a robot from a stop position to a work origin position in a simple manner without increasing a load on the system.

Specifically, an area map that includes at least the area where the robot operates is used. This area map is divided into blocks with a predetermined area. For each partitioned block, a limited return method is adopted in which a calculation is performed to set the return direction of the robot.

[patent related art 1] JP 2009-90383 A

However, the limited return method disclosed in JP 2009-90383 A requires considerable work, such as previously registering the area in which interference with the robot operation occurs and the return direction of the robot, and preparing an area block which is an operation area of the robot. As a result, this increases the amount of work for the operator.

SUMMARY

In view of the foregoing conventional art, it is thus desired to provide a control device for returning a robot equipped with an arm which is a movable part, to an origin thereof and a searching method for a return path therefor, which are able to easily search a return path to the origin in a simple manner based on operation log data of the robot.

According to an origin return path searching device for an arm of a robot, which is employed by a device for controlling return of robot to origin thereof, recited in an exemplary embodiment, a return path searching processing performs decimation processing by deleting operation log data located between two operation log data located on both ends of a straight portion included in the trajectory of the arm of the robot, and uses remaining operation log data left when the decimation processing is completed for searching the return path. That is, when there is a straight portion in the trajectory of the robot, a return path can be successfully searched using the operation log data located on both ends of the straight portion. Accordingly, it is possible to reduce the amount of operation log data used for searching of a return path, and thus reduce the time required for searching.

According to an origin return path searching device for an arm of a robot recited in another exemplary embodiment, a return path searching processing performs the same processing for two operation log data located on both ends of two continuous line segments that are regarded as a straight line included in the trajectory of the robot. The "two continuous line segments that are regarded as a straight line" means that the two continuous line segments can be regarded as substantially a single straight line. That is, when a portion of the trajectory can be regarded as substantially a single straight line, even if it is not strictly a straight line, the same processing as in claim 1 can be performed.

Preferably, according to an origin return path searching device for an arm of a robot, the return path searching processing deletes the operation log data D(R+X) when an angle formed between a first vector and a second vector for each of a position and a posture of an end effector of the robot is greater than a threshold, the first vector being determined by the operation log data D(R+X) and the operation log data D(R) and the second vector being determined by the operation log data D(R+X) and the operation log data D(R+X+1), and compares an angle formed between the first vector and the second vector with the threshold after the variable X is incremented. The "R and X" in the data D(R) and D(R+X) are indices representing the order of acquisition of the operation log data by a sequential number or the like. The initial value of R and X is "1", and the operation log data D(1) represents the return origin.

The return path searching processing unit leaves the operation log data D(R+X) when the angle formed between the first vector and the second vector is smaller than or equal to the threshold, and compares an angle formed between the first vector and the second vector with the threshold after the operation log data D(R+X) is set to a next operation log data D(R), that is, the variable "R+X" is substituted for the variable R and the variable X is set to an initial value "1". Thus, the decimation processing is repeatedly performed. When the operation log data D(R+X+1) reaches the current position, the decimation processing is stopped.

With this configuration, when it is determined that three operation log data D(R), D(R+X) and D(R+X+1) are aligned on a straight line by using the setting of the threshold, the intermediate operation log data D(R+X) can be deleted. Accordingly, the amount of operation log data used for searching of a return path can be reduced.

Preferably, according to an origin return path searching device for an arm of a robot, the return path searching processing performs integration processing by integrating two nodes determined by two operation log data adjacent to each other among the remaining operation log data into a single node when a displacement amount in each of position and posture of an end effector of the robot determined by the two operation log data adjacent to each other is smaller than a threshold, and uses a node integrated by the integration processing for searching the return path. That is, depending on the trajectory along which the robot has moved, the positions and postures of the end effector determined by two operation log data among the remaining operation log data are substantially the same. Accordingly, there may be a case where these can be integrated without causing a problem in return path searching. In such a case, by integrating two nodes determined by two operation log data into a single node, it is possible to reduce the amount of nodes used for searching of a return path, and thus further reduce the time required for searching.

Still preferably, according to an origin return path searching device for the arm of the robot, the return path searching processing generates a return path by interpolating a node determined by operation log data located on a path between two of the nodes used for searching of the return path after the integration processing is performed, among the operation log data deleted by the decimation processing, into the path between two of the nodes. By interpolating the operation log data located on a path between two of the nodes after the return path is searched, the trajectory along which the robot has moved from the return origin to the current position can be traced in the opposite direction in a more accurate manner when the robot is actually moved to the return origin along the searched path. Accordingly, the possibility of the robot contacting an obstacle or the like during movement of the robot to the return origin can be further reduced.

In addition, as other modes of the present disclosure, there are also provided a method of searching a return path of a robot provided with a movable arm (i.e., robot arm or manipulator), to an origin thereof, a control device therefor, and a recording medium in which the searching method can be installed preferably, which provide the equivalent operational advantages to those gained by the foregoing exemplary embodiments. The configurations and advantageous effects can be made clearer by preferred embodiments which are explained in later together with the attached drawings.

BRIEF DESCRIPTION OF THE DRAWINGS

In the accompanying drawings:

FIG. 2A-1 and FIG. 2A-2 is a flowchart showing a series of origin return control (part 1).

DETAILED DESCRIPTION OF THE PREFERRED EMBODIMENTS

First Embodiment

With reference to FIGS. 1 to 12, a first embodiment will be described. A robot system 1 shown in FIG. 1 includes a multi-articulated robot 10 and a robot controller 20.

Figure 1:
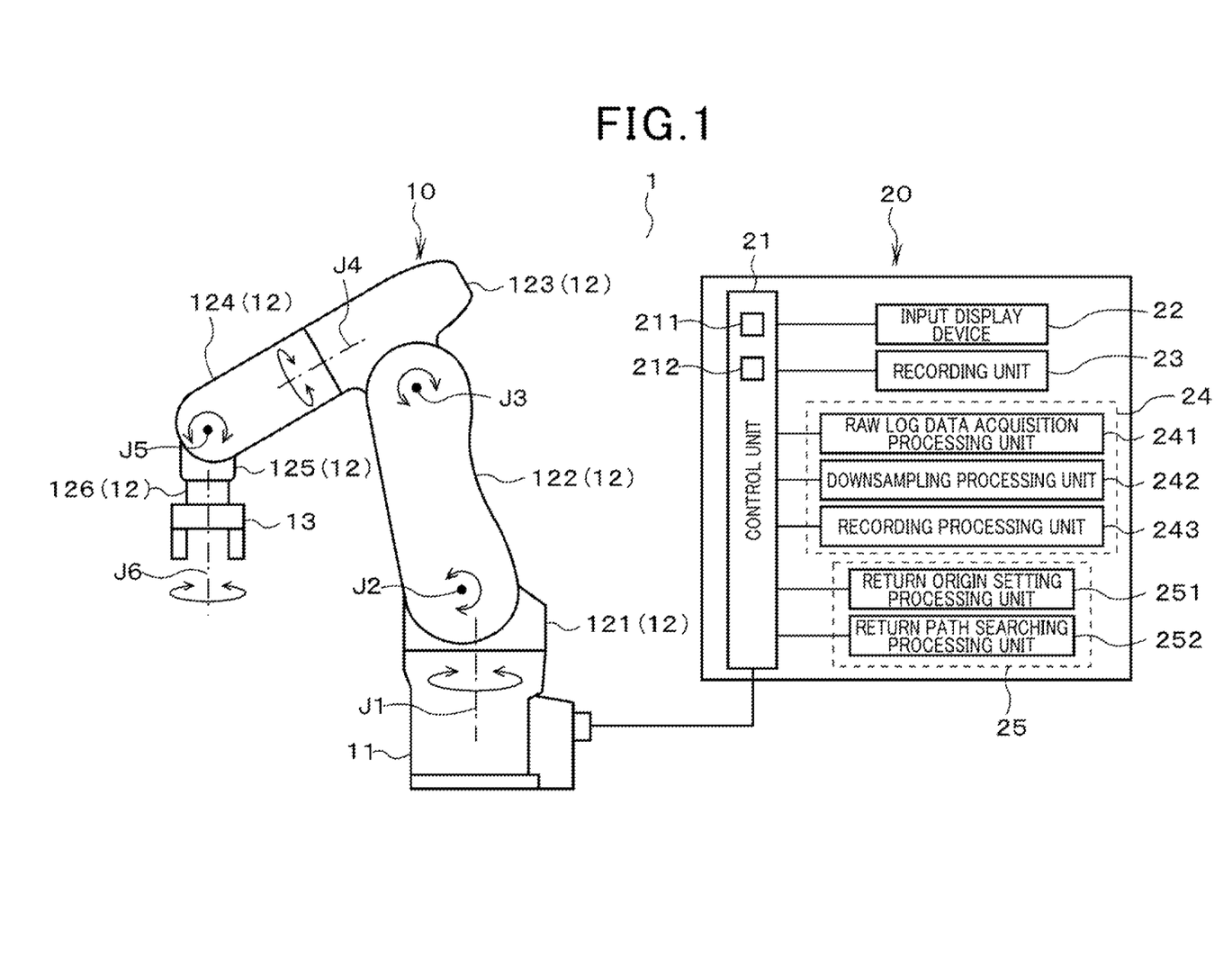
FIG. 1 is a diagram schematically illustrates a configuration of a robot system including an operation log data recording device and an origin return path searching device according to a first embodiment.

This multi-articulated robot 10 (hereinafter, simply referred to as a robot) functions as a robot arm (or manipulator). This robot 10 is a vertically articulated robot having a plurality of arms (which are arm portions mutually linked so as to be movable via joints (providing axes)), and controlled by the robot controller 20. The robot 10 may also be, for example, a horizontally articulated robot, a parallel link robot, an orthogonal robot, or the like. The robot 10 and the robot controller 20 are communicable with each other via a wired or wireless connection. The robot controller 20 may also be communicably connected to an external device, for example, a personal computer or a portable terminal such as a smartphone via a wired or wireless connection.

In the present embodiment, the robot 10 is an industrial robot arm (i.e., manipulator), and may be, for example, a 6-axis vertically articulated robot. As shown in FIG. 1, the robot 10 includes a base 11 and a plurality of arms, in this example, 6 arms 121 to 126 mutually articulated.

When the robot 10 is a stationary type, the base 11 is fixed to an installation surface. Further, when the robot 10 is small-sized and can be carried by a person, the base 11 is not necessarily fixed to an installation surface. For example, the base 11 may be structured to be movable on a rail. The arms 121 to 126 are disposed in this order on the base 11. In the present embodiment, the arms are referred to as a first arm 121, a second arm 122, a third arm 123, a fourth arm 124, a fifth arm 125 and a sixth arm 126 in the order from a side of the base 11. When each of the arms 121 to 126 is not specified, the arms 121 to 126 are collectively referred to as an arm 12.

The arms 121 to 126 is rotatably linked to each other via a plurality of axes J1 to J6 (structurally, provided by geometrical axes passing through the joints, respectively) such that each of the arms 121 to 126 is rotatable around a corresponding one of the axes J1 to J6. Hence, there is provided a single robot arm (manipulator) installed on the base 11 and provided together with the base 11.

In this case, the axes are referred to as a first axis J1, a second axis J2, a third axis J3, a fourth axis J4, a fifth axis J5 and a sixth axis J6 in the order from a side of the base 11. When each of the axes J1 to J6 is not specified, the axes 31 to 36 are collectively referred to as an axis J. The first axis J1 is a rotation axis extending in the vertical direction, and connects the first arm 121 to the base 11 in a manner rotatable in the horizontal direction. The second axis J2 is a rotation axis extending in the horizontal direction, and connects the second arm 122 to the first arm 121 in a manner rotatable in the vertical direction.

The third axis J3 is a rotation axis extending in the horizontal direction, and connects the third arm 123 to the second arm 122 in a manner rotatable in the vertical direction. The fourth axis J4 is a rotation axis extending in the longitudinal direction of the third arm 123, and connects the fourth arm 124 to the third arm 123 in a rotatable manner. The fifth axis J5 is a rotation axis extending in the horizontal direction, and connects the fifth arm 125 to the fourth arm 124 in a manner rotatable in the vertical direction. The sixth axis J6 is a rotation axis extending in the longitudinal direction of the fifth arm 125, and connects the sixth arm 126 to the fifth arm 125 in a rotatable manner.

The sixth arm 126 is an end effector of the robot 10, and may be formed, for example, in a flange shape. A tool 13 is detachably attached to a distal end of the sixth arm 126. For example, the tool 13 may be one for holding and transporting a workpiece, such as a chuck, a gripper, or a suction hand, or a machining tool for performing various types of machining operations to a workpiece, such as a fastener or a drill. The tool 13 can be appropriately selected according to the application of the robot 10. Although not shown in the figure, the robot 10 includes a motor for driving each of the axes J1 to J6, an encoder for detecting the rotation speed and position of each of the axes J1 to J6, a brake for stopping the motion of each of the axes J1 to J6, and the like.

The robot controller 20 includes a control unit 21, an input display device 22, a recording unit 23, an operation log data recording device 24 and an origin return path searching device 25. The control unit 21 is mainly composed of a microcomputer including, for example, a CPU 211 and a storage area 212 such as a ROM, a RAM, or a rewritable flash memory, and controls the entire operation of the robot 10. The input display device 22 has a switch device such as a touch panel or an electrical or mechanical switch, and a display function such as a liquid crystal screen. The recording unit 23 may be, for example, a storage device that can write and read various information in response to an instruction from the robot controller 20, or a device that can write data to a recording medium such as a CD, a DVD, or the like.

Further, the recording unit 23 may be, for example, a recording device using a flash memory or the like fixedly installed in the housing of the robot controller 20, or may be a USB memory or a memory card removably inserted into the robot controller 20. The recording unit 23 may also be an external online storage communicably connected via the Internet, a LAN or a WAN.

The storage area 212 of the control unit 21 stores a robot control program for driving and controlling the robot 10. The robot controller 20 controls the operation of the robot 10 by the CPU 211 executing the robot control program. In the present embodiment, the storage area 212 stores an operation log data recording program and an origin return path searching program.

The storage area 212 is thus provided as a non-transitory computer readable medium which is a recording medium in the disclosure.

The control unit 21 functionally implements a raw log data acquisition processing unit 241, a downsampling processing unit 242, a recording processing unit 243, and the like by software by the CPU 211 executing the operation log data recording program. In this case, the raw log data acquisition processing unit 241, the downsampling processing unit 242 and the recording processing unit 243 constitute the operation log data recording device 24. That is, in the present embodiment, the robot controller 20 includes the operation log data recording device 24.

Further, the control unit 21 virtually implements a return origin setting processing unit 251 and a return path searching processing unit 252 by software by the CPU 211 executing the origin return path searching program. In this case, the return origin setting processing unit 251 and the return path searching processing unit 252 constitute the origin return path searching device 25 (, which is a device for searching a return path of the robot to its origin in a space in which the robot arm is allowed to move). That is, in the present embodiment, the robot controller 20 functionally includes the origin return path searching device 25 which performs a method of searching a return path of the robot arm to its position of the origin position and its posture at the origin position.

Alternatively, the operation log data recording program and the origin return path searching program may also be stored in the recording unit 23 or an external recording medium, and installed into the control unit 21 or directly executed from the recording unit 23 or the external recording medium. The raw log data acquisition processing unit 241, the downsampling processing unit 242 and the recording processing unit 243 may also be implemented by hardware, for example, as an integrated circuit integrated with the control unit 21. Further, the return origin setting processing unit 251 and the return path searching processing unit 252 may also be implemented by hardware, for example, as an integrated circuit integrated with the control unit 21.

Next, the operation log data recording device 24 will be described. The operation log data recording device 24 is configured to acquire operation log data during automatic operation of the robot 10, perform downsampling or decimation of the acquired operation log data according to a predetermined condition, and record the downsampled or decimated data to the recording unit 23. The operation log data recording device 24 can access the recording unit 23 by the processing from the control unit 21. The operation log data recording device 24 includes the raw log data acquisition processing unit 241, the downsampling processing unit 242 and the recording processing unit 243.

The raw log data acquisition processing unit 241 is configured to execute raw log data acquisition processing. In the raw log data acquisition processing, angular information of the respective axes J1 to J6 of the robot 10 during the operation of the robot 10 is acquired as raw log data at a regular interval. In the following description, the operation log data of the operation of the robot 10 may be simply referred to as log data, or may also be referred to as operation log data D (N).

The operation log data may at least include angular information $\alpha 1(N)$ to $\alpha 6(N)$ on the operation of the axes J1 to J6, respectively, and positional information P(N) of the end effector, that is, positional information of the distal end of the tool 13 or the distal end of the sixth arm 126. In this case, the angular information $\alpha 1(N)$ to $\alpha 6(N)$ of the operation of the respective axes J1 to J6 may include, for example, an operation angle, an angular velocity, and an angular acceleration of the axes J1 to J6, respectively. Further, the operation log data D(N) of the robot 10 may also include velocity information and acceleration information of the distal end of the tool 13 or the distal end of the sixth arm 126. The N represents the order of acquisition of the operation log data, and can be expressed by a sequential number or an acquisition time.

The raw log data acquisition processing unit 241 acquires the operation log data of the robot 10 during the operation of the robot 10 at a regular interval of, for example, several milliseconds to several tens of milliseconds. In the present embodiment, when the raw log data acquisition processing is executed during the operation of the robot 10, the raw log data acquisition processing unit 241 temporarily stores the raw log data acquired during the operation of the robot 10 in the buffer of the storage area 212.

In this case, the raw log data acquisition processing may temporarily store the acquired raw log data D(N), for example, in the buffer provided in a volatile memory such as a RAM in the storage area 212. When a predetermined amount of raw log data D(N) are accumulated in the buffer, the downsampling processing unit 242 executes downsampling processing for the predetermined amount of data. In the downsampling processing, the data satisfying a predetermined condition among the raw log data acquired by the raw log data acquisition processing unit 241 are excluded from the data to be recorded.

Figure 2A:
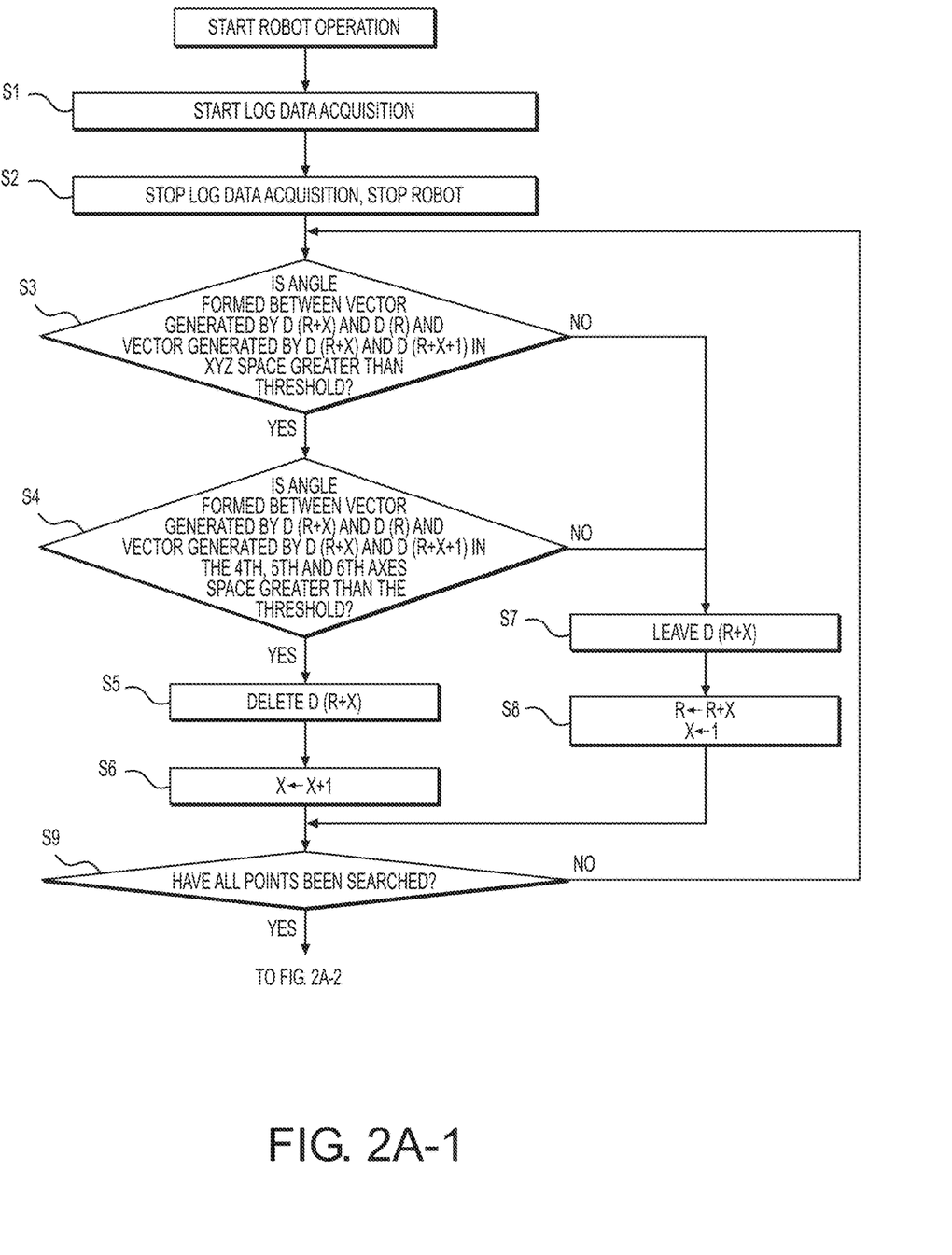
Figure 2A:
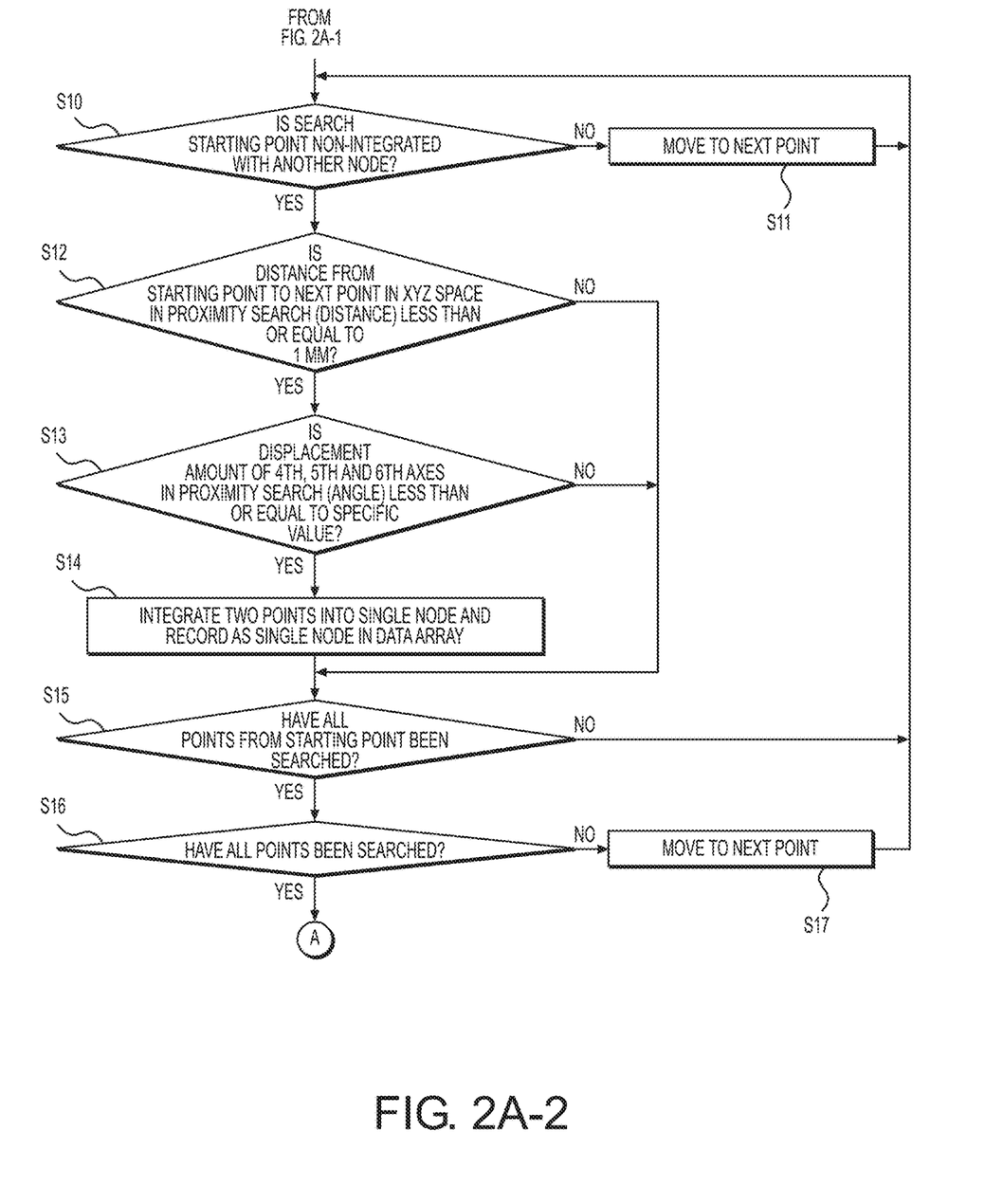

Next, an effect of the present embodiment will be described. FIG. 2A-1, FIG. 2A-2 and FIG. 2B is a flowchart of a series of control executed by the robot controller 20 for returning the robot 10 to the position coordinate of the origin and the posture at the origin, i.e., referred to as an origin position, when the robot 10 collides with an obstacle or the like and stops the operation. The procedure shown in FIG. 2A-1 thru FIG. 2B includes the raw log data acquisition processing (FIG. 2A-1, S1) and the downsampling processing (S3 to S9) described above, calculation node generation processing (FIG. 2A-2, S10 to S16), path searching processing (FIG. 2B, S18), path generation processing (S19 to S23) and origin position return processing (S24). First, the overview of each processing will be described.

[Downsampling (Decimation) Processing]

Figure 3:
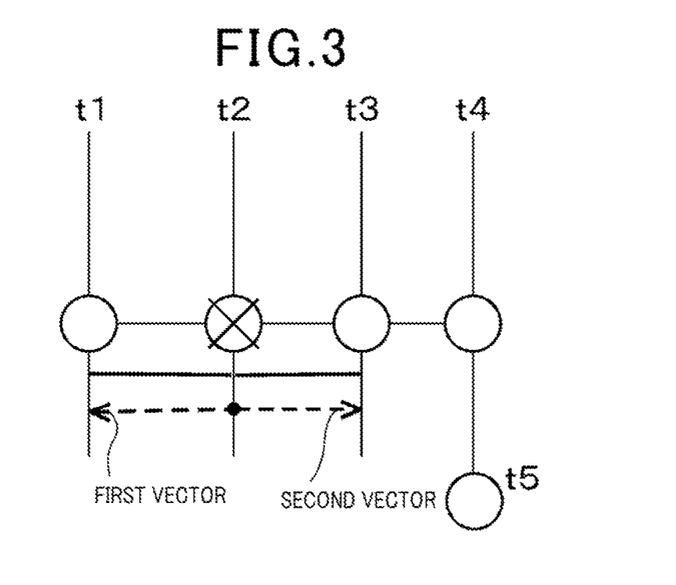
FIG. 3 is a diagram illustrating downsampling processing (part 1).

FIGS. 3 to 7 schematically show the outline of downsampling processing, in other words, decimation processing. For example, as shown in FIG. 3, when the raw log data t1 to t5 are acquired by the raw log data acquisition processing, the downsampling processing unit 242 compares an angle formed between a first vector generated by the data t2 to t1 and a second vector generated by the data t2 to t3 with a threshold. The threshold may be set to, for example, 179 degrees. In this case, the angle formed between these vectors is greater than the threshold. Therefore, it is determined that the raw log data t1, t2 and t3 are aligned on a straight line (or can be regarded as being a straight line), and the raw log data t2 is deleted.

Figure 4:
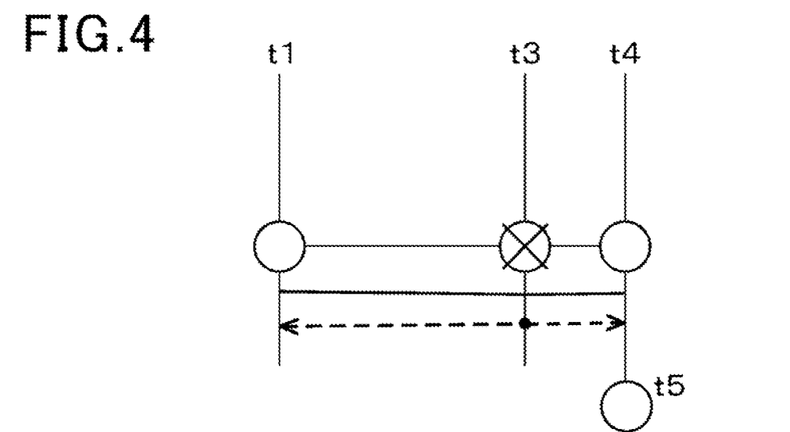
FIG. 4 is a diagram illustrating downsampling processing (part 2).

Next, as shown in FIG. 4, the downsampling processing unit 242 compares an angle formed between a first vector generated by the data t3 to t1 and a second vector generated by the data t3 to t4 with the threshold. In this case as well, the angle formed between these vectors is greater than the threshold. Therefore, it is determined that the raw log data t1, t3 and t4 are aligned on a straight line (or can be regarded as being a straight line), and the raw log data t3 is deleted.

Figure 5:
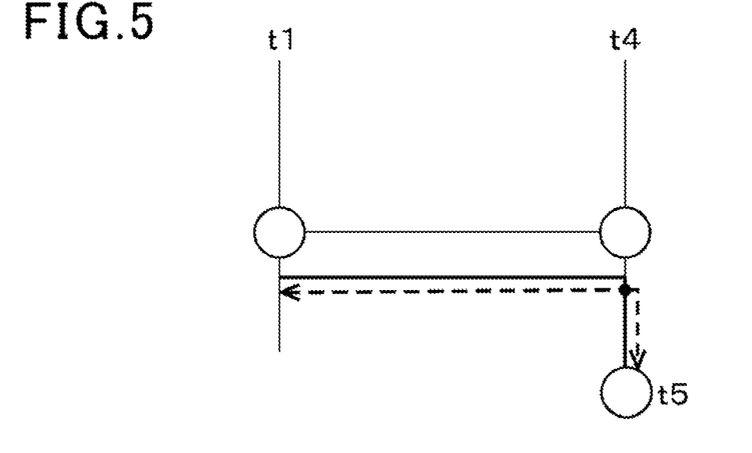
FIG. 5 is a diagram illustrating downsampling processing (part 3).

Next, as shown in FIG. 5, the downsampling processing unit 242 compares an angle formed between a first vector generated by the data t4 to t1 and a second vector generated by the data t4 to t5 with the threshold. In this case, the angle formed between these vectors is less than or equal to the threshold. Therefore, the raw log data t4 is left without being deleted. The above comparison between the angle formed between the first vector and the second vector with the threshold is performed for both P-type data, that is, the position determined by the X, Y and Z coordinate values, and J-type data, that is, the posture determined by the angle formed by the 4th, 5th and 6th axes of the 6-axis robot 10.

The above processing can be generalized as three raw log data D(R), D(R+X) and D(R+X+1). The variables R and X are natural numbers, and when they are set to the initial value "1", the data are D(1), D(2) and D(3), corresponding to the case shown in FIG. 3. In the case shown in FIG. 4, in which the data D(2) has been deleted and the variable X incremented, the data are D(1), D(3) and D(4). In the case shown in FIG. 5, in which the data D(3) has been deleted and the variable X is further incremented, the data are D(1), D(4) and D(5).

Figure 6:
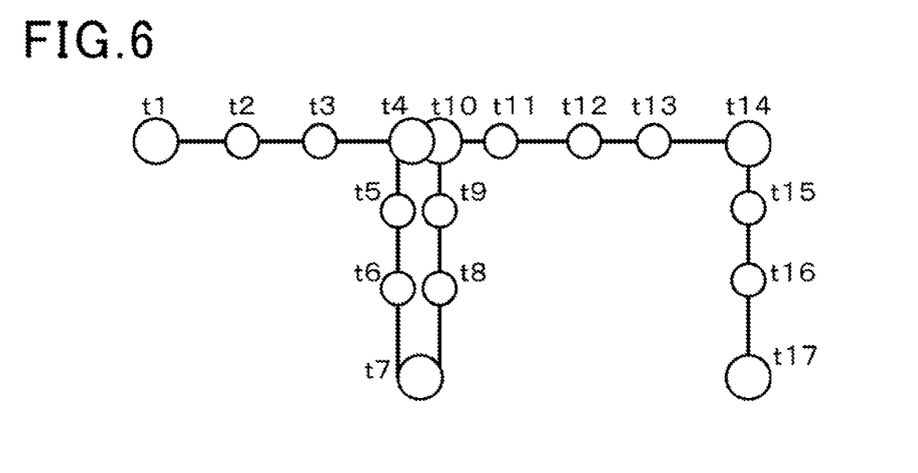
FIG. 6 is a diagram illustrating an example of operation log data acquired by raw log data acquisition processing.

As shown in FIG. 6, when the data t5 shown in FIG. 5 is followed by the data t6; D(6), the data D(4) is deleted, and then the variable R is set to 4 and the variable X is set to the initial value "1". Accordingly, the three data become D(4), D(5) and D(6). That is, the intermediate data D(R+X) becomes the starting point of the first vector and the second vector. As described above, the downsampling processing is performed.

Figure 7:
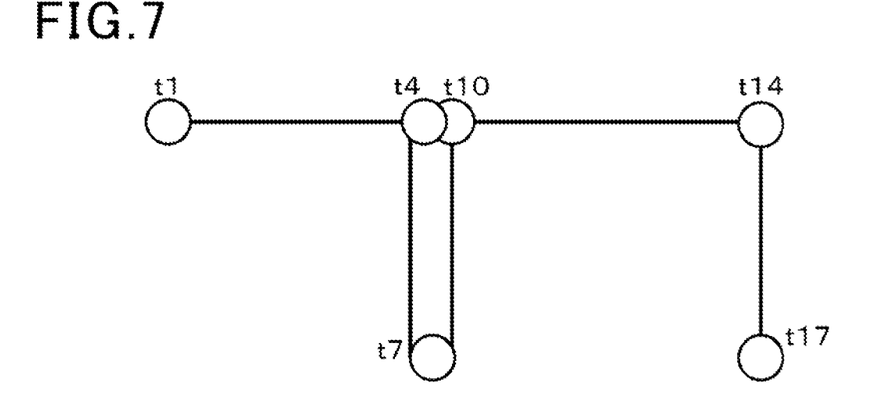
FIG. 7 is a diagram illustrating an example of remaining data as a result of downsampling processing performed on the operation log data shown in FIG. 6.

For example, when the downsampling processing is performed for the data t1 to t17 acquired by the raw log data acquisition processing as shown in FIG. 6, only the data on both ends of straight portions in the motion trajectory of the robot 10 are left as shown in FIG. 7. Accordingly, the data t1-t4, t4-t7, t7-t10, t10-t14 and t14-t17 are left as remaining operation log data, while the raw log data located between both ends are deleted.

[Calculation Node Generation Processing]

Figure 8:
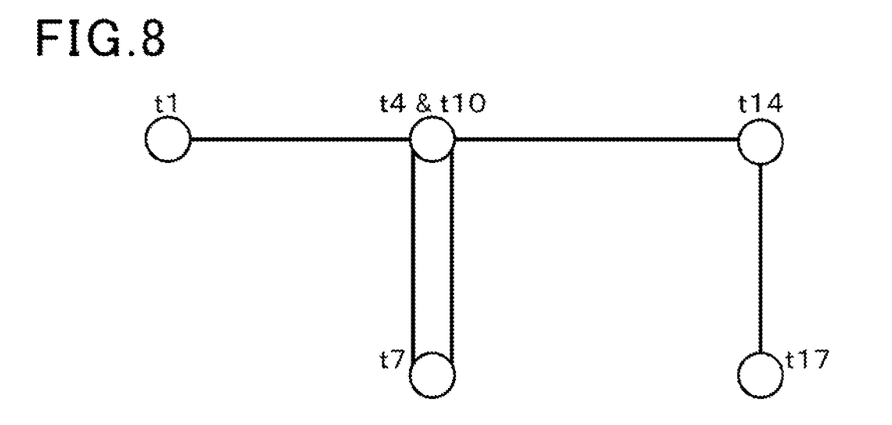
FIG. 8 is a diagram illustrating a case where a node used for origin return path searching is an undirected graph.

As shown in FIG. 7, in the motion trajectory moving from the node t4 to node t7, and then to the node t10, the nodes t4 and t10 are in proximity to each other. Such two nodes in proximity to each other can be substantially integrated into a single node, and this does not cause a problem in path searching. Therefore, for two nodes arranged in a time series among the nodes composed of the remaining operation log data, the return path searching processing unit 252 compares six values, i.e., the coordinate values (X, Y, Z) of P-type data and the angles (4th, 5th and 6th axes) of J-type data, with a threshold in the same manner as in the downsampling processing, and determines whether the two nodes can be integrated into a single node. The threshold for the position may be set, for example, to approximately 1 mm, and the threshold for the angle may be set, for example, to approximately 0.457 degrees. FIG. 8 is a diagram illustrating that the nodes t4 and t10 has been integrated and regarded as a single node.

Figure 9:
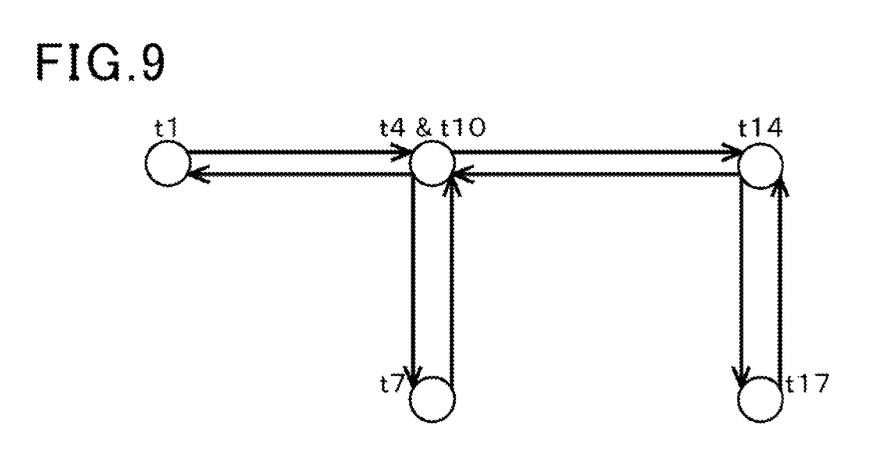
FIG. 9 is a diagram illustrating a case where a node used for origin return path searching is a directed graph.
Figure 10:
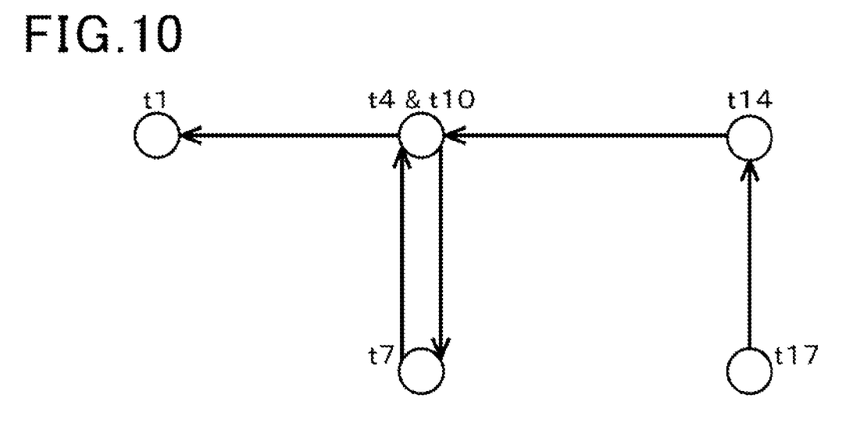
FIG. 10 is a diagram illustrating an example of a result of origin return path searching (part 1).

The node used for path searching may be either an undirected graph shown in FIG. 9 or a directed graph shown in FIG. 10. When the undirected graph is used, in which two nodes are bidirectionally connected, path searching is performed assuming that all the paths are bidirectional. The undirected graph has an advantage that a shortest path can be calculated. On the other hand, when the directed graph is used, in which two nodes are unidirectionally connected, a path for returning the path that has been once passed in a shortest manner in the opposite direction is searched. In the directed graph, the amount of data of the path associated to each node is half of that in the undirected graph.

In the case where the directed graph shown in FIG. 10 is used, the path returning to the origin is illustrated as t10 to t7 to t4. However, since the nodes t4 and t10 are integrated into a single node, the path to and from the node t7 is not required to be traced.

[Path Searching Processing]

Figure 11:
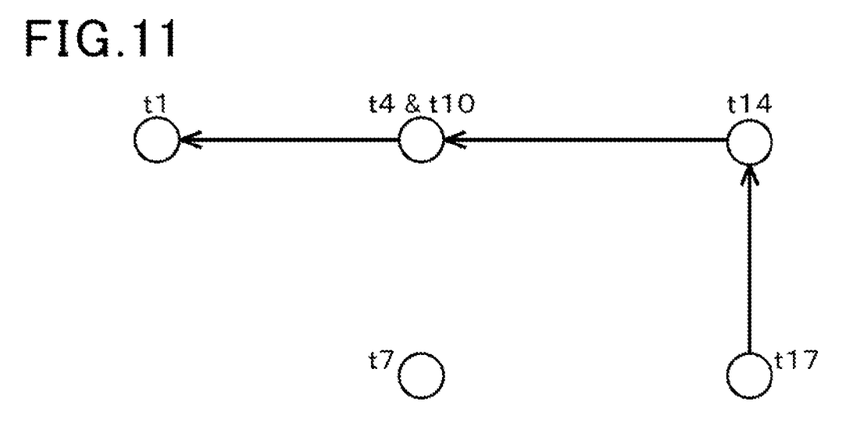
FIG. 11 is a diagram illustrating an example of a result of origin return path searching (part 2).
Figure 12:
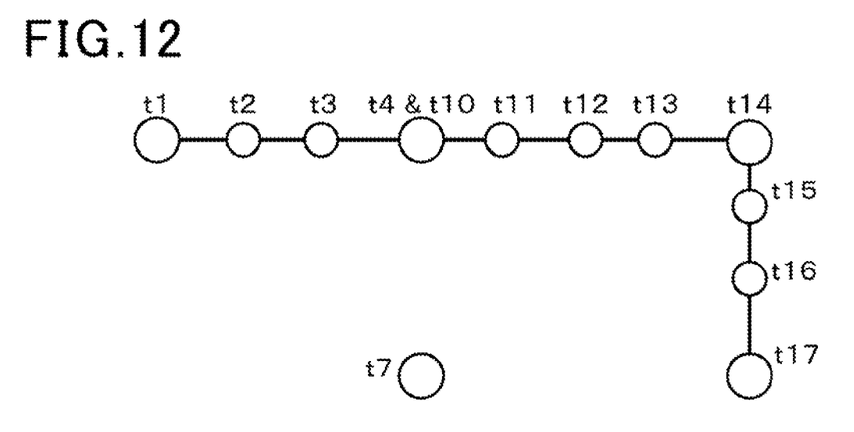
FIG. 12 is a diagram illustrating an example of a result of origin return path generation processing.

In the present embodiment, graph searching such as Dijkstra's algorithm using a priority queue is applied to the return path searching. When graph searching is performed for searching a path returning from the current position t17 to the origin t1 for the nodes shown in FIG. 8, the path t17 to t4 (& t10) to t1 can be derived as shown in FIG. 11. Then, among the raw log data that have been deleted in the downsampling processing, those located on the return path are again positioned as shown in FIG. 12. As a result, a path returning the robot 10 to the origin position more accurately traces the path from the origin position to the current position in the opposite direction.

Next, referring to the flowchart shown in FIG. 2A-1, FIG. 2A-2 and FIG. 2B, the description will be given of a flow in which each processing described above is performed. When the robot 10 starts the operation, the raw log data acquisition processing unit 241 starts raw log data acquisition (S1). Then, when the robot 10 collides with an obstacle or the like and stops the operation, the raw log data acquisition also stops (S2).

Subsequently, for three raw log data D(R), D(R+X) and D(R+X+1) arranged in a time series, the downsampling processing unit 242 compares an angle formed between a first vector: D(R+X) to D(R) and a second vector: D(R+X) to D(R+X+1) in the XYZ space with a threshold (S3). When the angle formed between these vectors is greater than the threshold (YES), an angle formed between these vectors in the fourth, fifth and sixth axes space is compared with the threshold (S4).

If it is determined "YES" in step S4, the data D(R+X) which is a starting point of both of these vectors is deleted (S5), and the variable X is incremented (S6). On the other hand, if it is determined "NO" in step S3 or S4, the data D(R+X) is left (S7), and then (R+X) is substituted for the variable R and the variable X is initialized to 1 (S8). Then, if all the log data have not been searched (NO in S9), the process returns to step S3. The above steps S3 to S9 correspond to the downsampling processing.

If all the log data have been searched (YES in S9), the process proceeds to the calculation node generation processing. The target of the processing is the remaining operation log data which are left after the downsampling processing.

First, it is determined whether the search starting point is non-integrated with another node (S10). When the starting point is non-integrated (YES), it is determined whether a distance from the starting point to the next point is less than or equal to 1 mm (S12). If the distance is less than or equal to 1 mm (YES), it is determined whether the displacement amount of the 4th, 5th and 6th axes is less than or equal to a specific value, in this case, 0.457 degrees (S13).

If it is determined "YES" in step S13, two points are recorded as a single node in the data array (S14). Then, it is determined whether all the points from the starting point have been searched (S15). If all the points from the starting point have been searched (YES), it is then determined whether all the points in the remaining operation log data have been searched (S16). If it is determined "YES" in S16, the process proceeds to step S18. If it is determined "NO" in steps S10 or S16, the search starting point moves to the next point (S11, S17) and the process returns to step S10. If it is determined "NO" in steps S12 or S13, the process proceeds to step S15. The description above is the calculation node generation processing.

Figure 2B:
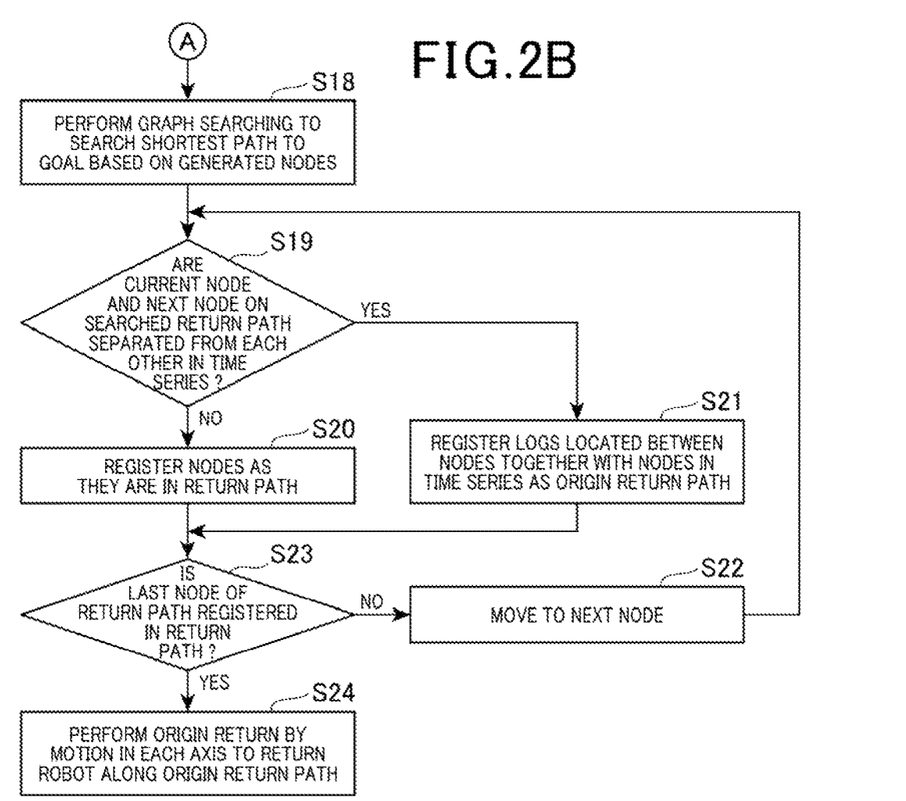
FIG. 2B is a flowchart showing a series of origin return control (part 2).

Step S18 corresponds to the path searching processing, in which graph searching is performed to search the shortest path to a goal, that is, to a return origin based on the nodes generated by the calculation node generation processing, that is, the nodes partially integrated (S18). Then, the process proceeds to step S19, which corresponds to the path generation processing.

In step S19, it is determined whether the current node and the next node on the searched return path are separated from each other in a time series. Whether two nodes are "separated from each other in a time series" is determined based on whether the interval between the nodes is twice or more of a threshold. The threshold may be, for example, a sampling period of the log data. If two nodes are not separated from each other in a time series (NO), these nodes are registered as they are in the return path (S20). On the other hand, if two nodes are separated from each other in a time series (YES), the remaining log data located on the path between these two nodes are interpolated and registered in the return path together with the two nodes (S21).

Then, it is determined whether the last node of the return path, that is, the return origin is registered in the return path (S23). When the last node is not registered (NO), the node for the path generation processing moves to the next node (S22), and the process returns to step S19. The description above is the path generation processing. When the last node is registered (YES), the origin position return processing (S24) is performed in which the robot 10 is operated to return to the origin along the path.

As described above, according to the present embodiment, the return path searching processing unit 252 in the origin return path searching device 25 mounted in the robot controller 20 performs downsampling processing by deleting operation log data located between two operation log data located on both ends of a straight portion included in the trajectory of the robot 10, and uses remaining operation log data left when the downsampling processing is completed for searching the return path. That is, when there is a straight portion in the trajectory of the robot 10, a return path can be successfully searched using the operation log data located on both ends of the straight portion. Accordingly, it is possible to reduce the amount of operation log data used for searching of a return path, and thus reduce the time required for searching.

Specifically, the return path searching processing unit 252 deletes the data D(R+X) when an angle formed between a first vector and a second vector for each of a position and a posture of an end effector of the robot 10 is greater than a threshold, the first vector being determined by the operation log data D(R+X) and the operation log data D(R) and the second vector being determined by the operation log data D(R+X) and the operation log data D(R+X+1), and compares an angle formed between the first vector and the second vector with the threshold after the variable X is incremented. The return path searching processing unit 252 leaves the operation log data D(R+X) when the angle formed between the first vector and the second vector is smaller than or equal to the threshold, and compares an angle formed between the first vector and the second vector with the threshold after the operation log data D(R+X) is set to a next operation log data D(R), that is, the variable "R+X" is substituted for the variable R and the variable X is set to an initial value "1". Thus, the downsampling processing is repeatedly performed. When the data D(R+X+1) reaches the current position, the downsampling processing is stopped.

With this configuration, when it is determined that three operation log data D(R), D(R+X) and D(R+X+1) are aligned on a straight line by using the setting of the threshold, the intermediate operation log data D(R+X) can be deleted. Accordingly, the amount of operation log data used for searching of a return path can be reduced.

Further, the return path searching processing unit 252 performs integration processing by integrating two nodes determined by two operation log data adjacent to each other among the remaining operation log data into a single node when a displacement amount in each of position and posture of an end effector of the robot 10 determined by the two operation log data adjacent to each other is smaller than a threshold, and uses a node integrated by the integration processing for searching the return path. Accordingly, it is possible to reduce the amount of nodes used for searching of a return path, and thus further reduce the time required for searching.

Further, the return path searching processing unit 252 generates a return path by interpolating a node determined by operation log data located on a path between two of the nodes used for searching of the return path after the integration processing is performed, among the operation log data deleted by the downsampling processing, into the path between two of the nodes. Accordingly, the trajectory along which the robot 10 has moved from the return origin to the current position can be traced in the opposite direction in a more accurate manner, and the possibility of the robot 10 contacting an obstacle or the like during movement of the robot 10 to the return origin can be further reduced.

In the processing shown in FIGS. 2A-1 thru 2A-2 and 2B which is performed by the foregoing origin return path searching device 25, the steps S2 and S3 functionally correspond to a return necessity determining step (also, can be referred to as a process or means), the step S4 functionally corresponds to a straight-line portion determining step (also, can be referred to as a process or means), the steps S5 to S9 functionally correspond to a decimating step (also, can be referred to as a process or means), and the steps S10 to S23 functionally correspond to a calculation step (also, can be referred to as a process or means). Moreover, the step S24 functionally corresponds to return control means (or a return control unit).

Second Embodiment

Figure 13:
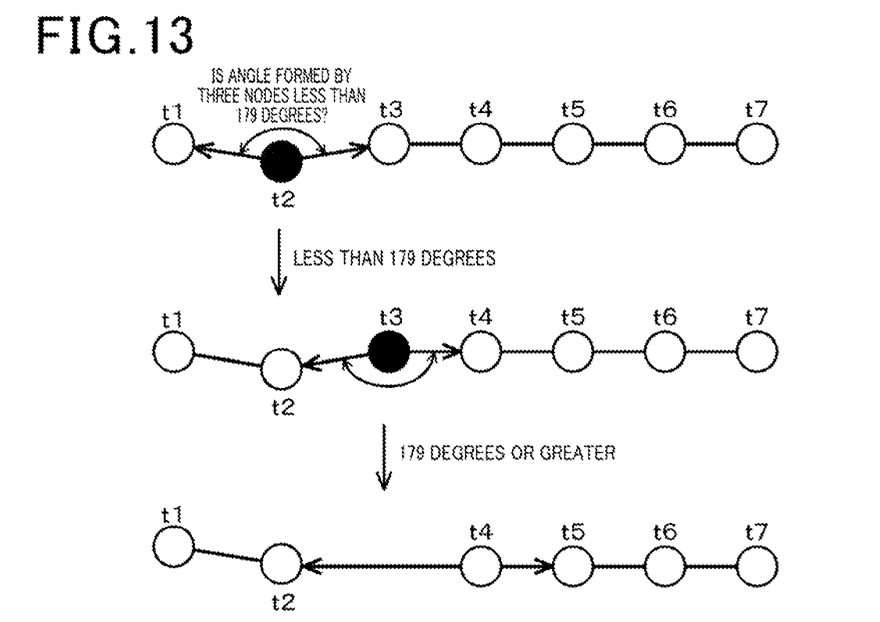
FIG. 13 is a diagram illustrating another example of origin return path searching processing and decimation processing according to a second embodiment (part 1).
Figure 14:
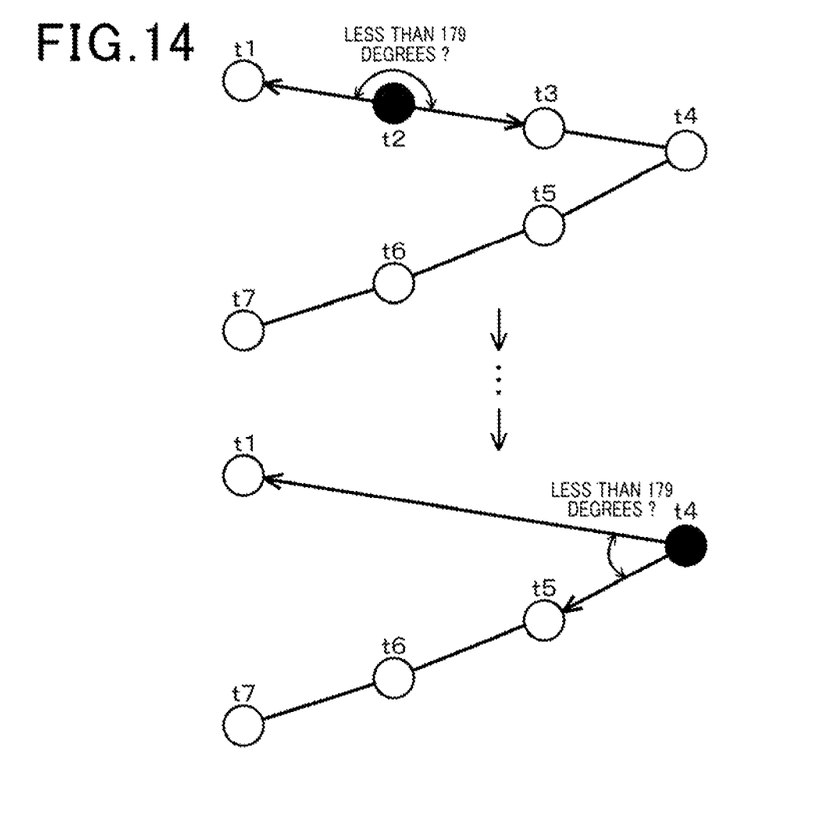
FIG. 14 is a diagram illustrating another example of origin return path searching processing and decimation processing (part 2-1).
Figure 15:
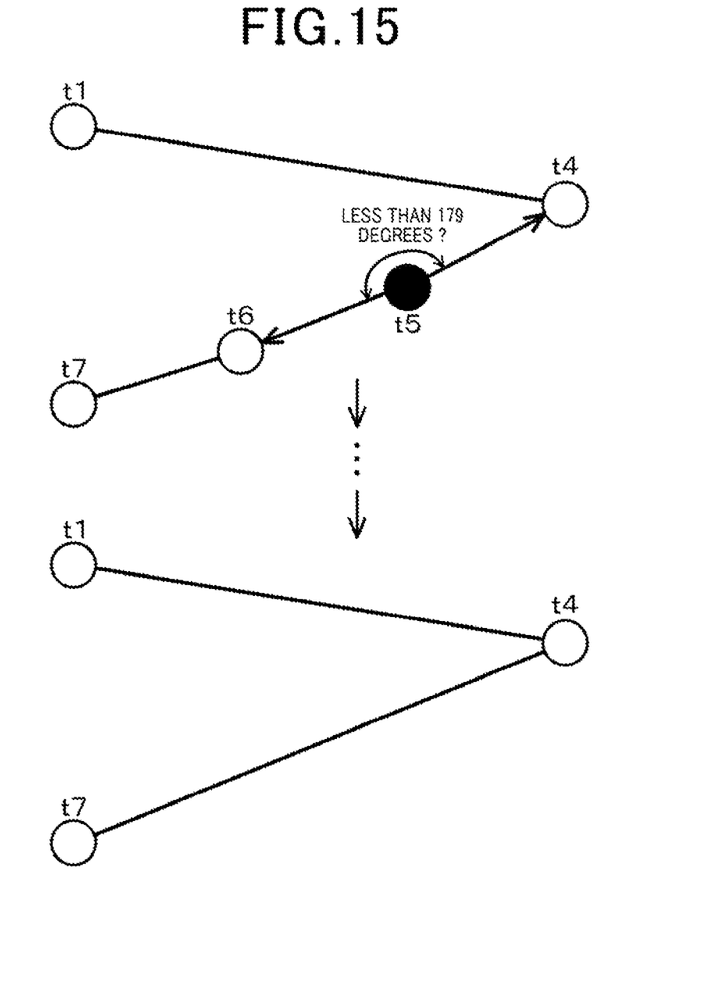
FIG. 15 is a diagram illustrating another example of origin return path searching processing and decimation processing (part 2-2).

With reference to FIGS. 13 to 15, a robot system according to a second embodiment will now be described.

The hardware components of this robot system are configured in the same way as those of the industrial robot system 1 of the first embodiment described above. For this reason, the same reference signs are applied to the components having the same or equivalent functions, and their description is omitted or simplified here.

Similar to the first embodiment, the robot system 1 of the second embodiment also has an articulated robot 10 and a robot controller 20, but the return path search performed by the robot controller 20 is different from that employed by the first embodiment.

In a second embodiment, another example of the decimation processing in the return path searching is described. As described in the first embodiment, the threshold for the decimation processing is set to 179 degrees. Therefore, as shown in FIGS. 13 to 15, when an angle formed between the first vector and the second vector is 179 degrees, these two continuous line segments can be regarded as a single straight line, although it is not strictly a straight line.

In FIG. 13, when an angle formed between a first vector spatially defined by log data t2 to t1 and a second vector spatially defined by rog data t2 to t3 is less than 179 degrees (that is, cannot be regarded as being a straight line), the raw log data t2 remains without being deleted (decimated). Then, when an angle formed between a first vector spatially defined by log data t3 to t2 and a second vector spatially defined by rog data t3 to t4 is 179 degrees (that is, can be regarded as being a straight line), the raw log data t3 is deleted.

As shown in FIG. 14, since it can be regarded that the raw log data t1 to t4 are aligned on a straight line, the intermediate data t2 and t3 are sequentially deleted (decimated). On the other hand, the raw log data t4 to t7 are not aligned on a straight line. However, since an angle formed between a first vector spatially defined by log data t5 to t4 and a second vector spatially defined by log data t5 to t6 is greater than or equal to 179 degrees (i.e., can be regarded as being a straight line), the raw log data t5 is deleted. Then, since an angle formed between a first vector spatially defined by log data t6 to t4 and a second vector spatially defied by log data t6 to t7 is also greater than or equal to 179 degrees (i.e., can be regarded as being a straight line), the raw log data t6 is also deleted as shown in FIG. 15.

However, if a first vector spatially directed from the log data t4 to t1 and a second vector spatially directed from the log data t4 to t5 are given, the angle that these vectors make is an acute angle, which is less than 179 degrees. For this reason, these vectors are not considered to make a straight line. Hence, as shown in FIG. 15, a return path routing from t1, to t4, and to t7 can be searched.

In this way, for example, even if there is an obstacle such as a pillar between the spatial positions indicated by log data t1 and t7, a detour route through the spatial position indicated by log data t4 can be set more reliably. Therefore, it is possible to search for a more accurate and reliable return path according to the judgment of whether it can be regarded as a straight line or a straight line.

The present disclosure is not limited to the embodiments described above and shown in the drawings. Various modifications, combinations, or extensions can be made without departing from the spirit of the present disclosure.

First of all, the classification of robots to which the search device and search method for the return path of the present disclosure can be applied is not necessarily limited to the aforementioned industrial robots used in manufacturing sites. The search device and method can be applied to any robot that has an arm (i.e., robot arm, manipulator) as a movable part that performs some work on an object, and that has a function to detect and return the arm to its predetermined origin in the event of an abnormality. For example, it can be a robot used in the service field, as exemplified by cooperative robots that work with people in recent years.

In addition, the downsampling processing is not necessarily performed according to the procedure shown in FIGS. 3 to 5. The integration of two nodes in proximity to each other may be performed as necessary. The interpolation of operation log data located between two nodes may also be performed as necessary. The specific numerical value of each threshold may be modified according to the individual design. The path search technique is not limited to graph search.

What is claimed is:

1. A method of searching a return path of a robot to an origin thereof, wherein the return path is for returning a movable arm of the robot from a current position to the origin on a trajectory of motions of the movable arm of the robot, based on operation log data of the robot which are recorded in a recording unit, the method being performed by a processor that executes a computer program that causes the processor to perform the method which comprises steps of:
  a return necessity determining step determining whether it is necessary to return the arm from the current position to the origin;
  a straight-line portion determining step determining whether there is a trajectory portion regarded as being a straight line on a motion trajectory of the arm, based on the operation log data recorded in the recording unit at a time when the return necessity determining step determines that the arm is necessary to be returned to the origin, the motion trajectory being provided at or before the return necessity determination;
  a decimating step decimating operation log data of a node which are present between two nodes which are at both ends of the trajectory portion regarded as being a straight line in a time-series space produced at every constant timing, when the straight-line portion determining step determines that there is the trajectory portion regarded as being the straight line on the motion trajectory of the arm; and
  a calculating step calculating the return path along which the arm returns to the origin, based on remaining operation log data which are left in the operation data log after the decimating, wherein
  the calculating step repeatedly performs decimation processing for three operation log data D(R; an initial value of R represents the return origin), D(R+X; X is a natural number and an initial value is 1) and D(R+X+1)
    by deleting the operation log data D(R+X) when an angle formed between a first vector and a second vector for each of a position and a posture of an end effector of the robot is greater than a threshold, the first vector being determined by the operation log data D(R+X) and the operation log data D(R) and the second vector being determined by the operation log data D(R+X) and the operation log data D(R+X+1), and comparing the angle formed between the first vector and the second vector with the threshold after the variable X is incremented, and
    by leaving the operation log data D(R+X) when the angle is smaller than or equal to the threshold, and comparing the angle formed between the first vector and the second vector with the threshold after the D(R+X) is set to a next operation log data D(R) and the variable X is set to an initial value "1", and
  the calculating step stops the decimation processing when the operation log data D(R+X+1) reaches the current position.

2. The method according to claim 1, wherein the operation log data is expressed by the nodes calculated at every constant timing based on the position and posture of the arm by a graph theory, and edges connecting the nodes; and
  the trajectory portion determined by the straight-line portion determining step consists of two of the edges, the two edges being connected to one of the nodes.

3. The method according to claim 1, wherein
  the calculating step performs integration processing by integrating two nodes determined by two operation log data adjacent to each other among the remaining operation log data into a single node when a displacement amount in each of the position and the posture of the end effector of the robot determined by the two operation log data adjacent to each other is smaller than a displacement threshold, and
  the calculating step uses the single node integrated by the integration processing for searching the return path.

4. The method according to claim 3, wherein
  the calculating step calculates the return path by interpolating a node determined by the operation log data located on a path between two of the nodes used for searching of the return path after the integration processing is performed, among the operation log data deleted by the decimation processing, into the path between two of the nodes.

5. A non-transitory computer-readable storage medium storing a program therein, the program enabling a CPU (central processing unit) serving as a calculator to access a recording unit in which operation log data of a robot with a movable arm is recorded, to perform steps for searching a return path along which a position and a posture of the arm of the robot is returned from a current position to an origin previously set on a trajectory of motions of the movable arm of the robot, based on the operation log data,
  the program enables the CPU to functionally perform:
  a return necessity determining step determining whether it is necessary to return the arm from the current position to the origin;
  a straight-line portion determining step determining whether there is a trajectory portion regarded as being a straight line on a motion trajectory of the arm, based on the operation log data recorded in the recording unit at a time when the return necessity determining step determines that the arm is necessary to be returned to the origin, the motion trajectory being provided at or before the return necessity determination;
  a decimating step decimating operation log data of a node which are present between two nodes which are at both ends of the trajectory portion regarded as being a straight line in a time-series space produced at every constant timing, when the straight-line portion determining step determines that there is the trajectory portion regarded as being the straight line on the motion trajectory of the arm; and
  a calculating step calculating the return path along which the arm returns to the origin, based on remaining operation log data which are left in the operation data log after the decimating, wherein
  the calculating step repeatedly performs decimation processing for three operation log data D(R; an initial value of R represents the return origin), D(R+X; X is a natural number and an initial value is 1) and D(R+X+1)
    by deleting the operation log data D(R+X) when an angle formed between a first vector and a second vector for each of a position and a posture of an end effector of the robot is greater than a threshold, the first vector being determined by the operation log data D(R+X) and the operation log data D(R) and the second vector being determined by the operation log data D(R+X) and the operation log data D(R+X+1), and comparing the angle formed between the first vector and the second vector with the threshold after the variable X is incremented, and
    by leaving the operation log data D(R+X) when the angle is smaller than or equal to the threshold, and comparing the angle formed between the first vector and the second vector with the threshold after the D(R+X) is set to a next operation log data D(R) and the variable X is set to an initial value "1", and
  the calculating step stops the decimation processing when the operation log data D(R+X+1) reaches the current position.

6. A device for controlling return of a robot with a movable arm, by which the arm is returned to a previously set origin in a space in which the arm is allowed to move, the device comprising:
- a recording unit into which a position and a posture of the arm are recorded at constant timing as operation log data of the robot; and
- a controller controlling motions of the arm, wherein the controller comprises:
- a return necessity determining unit determining whether it is necessary to return the arm from the current position to the origin;
- a straight-line portion determining unit determining whether there is a trajectory portion regarded as being a straight line on a motion trajectory of the arm, based on the operation log data recorded in the recording unit at a time when the return necessity determining unit determines that the arm is necessary to be returned to the origin, the motion trajectory being provided at or before the return necessity determination;
- a decimating unit decimating operation log data of a node which are present between two nodes which are at both ends of the trajectory portion regarded as being a straight line in a time-series space produced at every constant timing, when the straight-line portion determining unit determines that there is the trajectory portion regarded as being the straight line on the motion trajectory of the arm; and
- a calculating unit calculating the return path along which the arm returns to the origin, based on remaining operation log data which are left in the operation data log after the decimating, wherein the calculating unit is configured to
repeatedly perform decimation processing for three operation log data D(R; an initial value of R represents the return origin), D(R+X; X is a natural number and an initial value is 1) and D(R+X+1), which are arranged in a time series,
- by deleting the operation log data D(R+X) when an angle formed between a first vector and a second vector for each of a position and a posture of an end effector of the robot is greater than a threshold, the first vector being determined by the operation log data D(R+X) and the operation log data D(R) and the second vector being determined by the operation log data D(R+X) and the operation log data D(R+X+1), and comparing the angle formed between the first vector and the second vector with the threshold after the variable X is incremented, and
- by leaving the operation log data D(R+X) when the angle is smaller than or equal to the threshold, and comparing the angle formed between the first vector and the second vector with the threshold after the D(R+X) is set to a next operation log data D(R) and the variable X is set to an initial value "1", and stop the decimation processing when the operation log data D(R+X+1) reaches the current position.

7. The device according to claim 6, wherein the operation log data is expressed by the nodes calculated at every constant timing based on the position and posture of the arm by a graph theory, and edges connecting the nodes; and
the trajectory portion determined by the straight-line portion determining unit consists of two of the edges, the two edges being connected to one of the nodes.

8. The device according to claim 7, wherein the calculating unit is configured to
perform integration processing by integrating two nodes determined by two operation log data adjacent to each other among the remaining operation log data into a single node when a displacement amount in each of the position and the posture of the end effector of the robot determined by the two operation log data adjacent to each other is smaller than a displacement threshold; and
apply the single node integrated by the integration processing for searching the return path.

9. The device according to claim 6, wherein the calculating unit is configured to
perform integration processing by integrating two nodes determined by two operation log data adjacent to each other among the remaining operation log data into a single node when a displacement amount in each of the position and the posture of the end effector of the robot determined by the two operation log data adjacent to each other is smaller than a displacement threshold; and
apply the single node integrated by the integration processing for searching the return path.

10. The device according to claim 6, wherein
the calculating unit is configured to generate the return path by interpolating a node determined by the operation log data located on a path between two of the nodes used for searching of the return path after the integration processing is performed, among the operation log data deleted by the decimation processing, into the path between two of the nodes.

11. The device according to claim 6, further comprising a return control unit configured to return the position and the posture of the arm to the origin based on the return path calculated by the calculating unit.

* * * * *